(12) United States Patent
Miyazaki

(10) Patent No.: US 6,202,306 B1
(45) Date of Patent: Mar. 20, 2001

(54) METHOD FOR MANUFACTURING PRE-LOADED DOUBLE-ROW ROLLING BEARING UNIT

(75) Inventor: Seizo Miyazaki, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/311,137

(22) Filed: May 13, 1999

(30) Foreign Application Priority Data

May 15, 1998 (JP) .................................................. 10-133517

(51) Int. Cl.[7] .................................................. B21D 53/10
(52) U.S. Cl. .................................. 29/898.09; 29/898.062; 384/512; 384/513
(58) Field of Search ........................... 29/898.07, 898.09, 29/898.061, 898.062, 898.064; 73/801; 384/512, 506, 513, 516, 501

(56) References Cited

U.S. PATENT DOCUMENTS

| | | |
|---|---|---|
| 5,341,569 | 8/1994 | Takamizawa et al. . |
| 5,509,198 | 4/1996 | Takamizawa et al. ............ 29/898.09 |
| 5,524,343 | 6/1996 | Blanks ............................... 29/898.09 |
| 5,685,068 | 11/1997 | Bankestrom et al. ............ 29/898.07 |
| 5,996,230 | 12/1999 | Miyazaki et al. ............... 29/898.062 |

*Primary Examiner*—S. Thomas Hughes
*Assistant Examiner*—Marc W. Butler
(74) *Attorney, Agent, or Firm*—Helfgott & Karas, P.C.

(57) ABSTRACT

The preload of the double row rolling bearing unit after completion is kept at a proper value regardless of the elastic deformation of the shaft caused when pushing the inner race in the axial direction wherein the balls are first installed in the bearing at the first pitch $P_1$ of the ball rows which is larger than the pitch $p_1$ in the state where the preload is proper and then preloaded to a pitch slightly smaller than the second pitch $p_1$, so that the ball rows have the second pitch $p_1$ after the shaft is elastically restored.

11 Claims, 11 Drawing Sheets

METHOD FOR MANUFACTURING PRE-LOADED DOUBLE-ROW ROLLING BEARING UNIT

FIELD OF THE INVENTION

This invention is related to a method of manufacturing a rolling-bearing device that is assembled in rotating parts of all kinds of precision equipment, for example, spindle motor rotary actuator, or rotary encoder, a video tape recorder (VTR), hard disk drive (HDD), for a laser-beam printer (LBP), and is used for supporting those rotating parts.

DESCRIPTION OF THE PRIOR ART

Ball bearings are used in order to support rotatably and prevent the spindle of a VTR or HDD from wobbling (movement in the direction orthogonal to the axis) and vibrating in the axial direction. However, until now, a pair of ball bearings independently functioning (deep-groove type or angular type) have generally been used. Moreover, it is also thought that using a double row ball bearing could improve the efficiency of assembling the ball bearing in the rotation-support section.

A double row ball bearing comprises a shaft 2 having a pair of deep-groove inner ring raceways 1 formed around its outer peripheral surface as shown in FIG. 5(A), and an outer race 4 having a pair of deep-groove outer ring raceways 3 formed around its inner peripheral surface as shown in FIG. 5(B), so that they are assembled to be concentric with each other as shown in FIG. 5(C), and multiple balls 5 that rotate freely are located between the inner ring raceways 1 and outer ring raceways 3. Also installed as shown in FIG. 5(C) are cages 6 for holding the balls 5 which are evenly spaced around in the circumferential direction, and seals 7a which prevent dirt or the like from getting into the portion where the balls 5 are located.

These double-row, deep-groove ball bearings as shown in FIG. 5(C), are of a formerly known construction, however, it is difficult to construct such bearings that are capable of supporting the spindle of the VTR or HDD. The reason for this is described below.

Specifically, the ball bearing for supporting the spindle of a VTR or HDD must have extremely high precision in order to prevent the previously mentioned wobbling motion orthogonal to the axial direction and vibrating motion in the axial direction. Therefore, the ball bearing for supporting this spindle is used with a pre-load applied in the axial direction. On the other hand, if balls 5 are installed between the inner ring raceway 1 and the outer ring raceway 3 in order to assemble the deep-groove ball bearing, the inner ring raceway 1 and outer ring raceway 3 are made to be eccentric with each other, as shown in FIG. 6, and the space 8 that runs between the inner ring raceway 1 and outer ring raceway 3 in circumferential direction is partly increased, so that a specified number of balls 5 can be inserted through this large space part in the space 8 between the inner ring raceway 1 and outer ring raceway 3. Then, the inner ring raceway 1 and outer ring raceway 3 are made to be concentric with each other, and the specified number of balls 5 are evenly spaced around in the circumferential direction.

When rearranging the balls 5, that are inserted together at one place of the circumferential space, in order that they are evenly located in the space in the circumferential direction, each of the balls 5 must slide with respect to the inner ring raceway 1 and outer ring raceway 3. When doing this, if the inner ring raceway 1 and outer ring raceway 3 strongly press against the respective balls 5 (pre-load state), it is easy for the rolling surfaces of the inner ring raceway 1, outer ring raceway 3 and each of balls 5 to become damaged, and if they become damaged, problems such as vibration motion during rotation or decrease in durability may occur.

As a means for solving this kind of problem, for example, in Japanese Patent Publication No. Tokukai Hei 6-344233, assembling steps of the doubling-row rolling bearing unit as shown in FIGS. 7(A) to 7(D) and FIGS. 8(A) to 8(E) have been disclosed. First, in the case of the assembling steps for the bearing unit in the first example shown in FIGS. 7(A) to 7(D), a first member is formed by a shaft 9 as shown in FIG. 7(A) such that it has a small-diameter section 9a and a large-diameter section 9b that are continuous through a step section 9c, and a first deep-groove inner ring raceway 10, that is a first raceway, is formed around the first peripheral surface that is the outer peripheral surface of the large-diameter section 9b. The inner race 11, that is a third member, has an inner diameter that is slightly smaller in its free state than the outer diameter of the small-diameter section 9a. A second deep-groove inner ring raceway 12, that is a fourth raceway, is formed around the outer peripheral surface of this inner race 11, that is a third peripheral surface.

To form a rolling bearing unit which comprises this kind of shaft 9 and inner race 11, first, in a first step as shown in FIG. 7(B), the inner race 11 is fitted under sufficient fitting strength (such that it does not slidingly move by the reaction force of the applied pre-load) around the small-diameter section 9a of the shaft 9. Also, the pitch $P_1$ of the first inner ring raceway 10 formed around the outer peripheral surface of the large-diameter section 9b and the second inner ring raceway 12 formed around the outer peripheral surface of the inner race 11 is such that it is a little longer than the pitch $p_1$ (FIG. 7(D)) required for applying the prescribed pre-load to the completed rolling bearing unit ($P_1 > p_1$).

Next, in a second step omitted from illustration, the shaft 9 and inner race 11 that were assembled together in the first step are inserted inside a second member or cylindrical outer race 13. A pair of deep-groove outer ring raceways 14, which are second and third raceways, are formed around the inner peripheral surface of this outer race 13, that is a second peripheral surface. In this second step, this pair of outer ring raceways 14 are made to face the first and second inner ring raceways 10, 12.

Next, in a third step, the shaft 9 and inner race 11 are made to be eccentric with the outer race 13 in order to increase the size in part of the space 8 that runs around in the circumferential direction between the pair of outer ring raceways 14 and the first and second inner ring raceways 10, 12, as shown in FIG. 6. A specified number of balls 5 are then inserted in this space 8 through the large space part.

Next, in a fourth process as shown in FIG. 7(C), the shaft 9 and inner race 11 are made to be concentric again with the outer race 13 while moving in the circumferential direction the specified number of balls 5 inserted into the space 8 between the pair of outer ring raceways 14 and the first inner ring raceways 10 and second inner ring raceway 12 in order that the balls 5 are evenly spaced around in the circumferential direction respectively. Together with this process, as shown in FIG. 7(C), a cage 6 is installed for an area of each row of balls in order to hold each of the balls 5 in their evenly spaced positions around in the circumferential direction. Moreover, as needed, seals 7a are attached to the inner peripheral surfaces of the both ends of the outer race 13, respectively. In this state of FIG. 7(C), a pre-load has not yet been applied to each of the balls 5.

Finally, in a fifth process as shown in FIG. 7(D), by displacing the inner race 11 at the state of FIG. 7(C) toward the step section 9c in the axial direction (left direction in FIG. 7(C)) on the outer peripheral surface of the small-diameter section 9a of the shaft 9, the pitch of the first and second inner ring raceways 10, 12 is shortened and let it to become the pitch $p_1$ (shown in FIG. 7(D)) required for applying the specified pre-load.

In this state of FIG. 7(D), the pre-loaded double-row rolling bearing unit is completed with the specified pre-load applied to the balls 5. Even when completed in this way, there is still a clearance between the step section 9c and the end surface of the inner race 11.

In this double-row rolling bearing unit that has been pre-loaded in this way, there is a restraining force that occurs between the inner peripheral surface of the inner race 11 and the outer peripheral surface of the small-diameter section 9a due to the friction force of the interference fit. The restraining force is larger than the load in the axial direction which corresponds to the pre-loading. Accordingly, the inner race 11 does not slidingly move and there is no vanishment in the applied pre-load even if no adhesive is applied between the shaft 9 and the inner 11, thus it can be handled as an integral ball bearing. Therefore, the work of constructing a bearing section for the spindle of a VTR or HDD is simplified. Also, since the pre-load is applied along the axial direction, it is possible to rotatably support the spindle with high precision.

Next, in the case of the second example shown in FIGS. 8(A) to 8(E), the first member is formed by a main outer race 15, and on the inner peripheral surface, that is the first peripheral surface, of the first member or main outer race 15, there is a small-diameter section 15a, a large-diameter section 15b and a step section 15c that connects both of these sections 15a, 15b, as shown in FIG. 8(A). Also, the third member is a sub-outer race 16 which is capable of fitting inside the large-diameter section 15b. There are dented grooves 17a, 17b. The groove 17a is arc-shaped in cross section and formed around the circumference of the inner peripheral surface, that is the third peripheral surface, of this sub-outer race 16, while the groove 17ba is arc-shaped in cross section and formed around the circumference of the inner peripheral surface of the small-diameter section 15a. Moreover, the sub-outer race 16 has an outer diameter that is slightly larger in its free state than the inner diameter of the large-diameter section 15b.

In manufacturing a pre-loaded double-row rolling bearing unit by employing the main outer race 15 and sub outer race 16, first, in a first step, the sub outer race 16 is fitted under sufficient fitting strength inside the large-diameter section 15b, as shown in FIG. 8(B), and a first outer ring raceway 18, that is the first raceway, and second outer ring raceway 19, that is the fourth raceway, are formed in the dented grooves 17a, 17b, respectively as shown in FIG. 8(C).

Since the first and second outer ring raceways 18, 19 are formed with the main outer race 15 and sub outer race 16 assembled together in this way, it is possible to make the roundness (deviation from circular form) of both of these outer ring raceways 18, 19 highly precise, and keep the eccentricity between these outer ring raceways 18, 19 and the outer peripheral surface of the main outer race 15 to a minimum. The pitch, $P_2$, between the first outer ring raceways 18 and second outer ring raceway 19, which are formed in this way, is longer than the pitch $p_2$ (FIG. 8(E)) required for applying the specified pre-load ($P_2 > p_2$).

In this example, a shaft 2, that is the second member, has a pair of inner ring raceways 1 (see FIG. 8(D)), that are the second and third raceways, formed around its outer peripheral surface, that is the second peripheral surface.

Next, in a second step not shown, the second member or shaft 2 is inserted inside the main outer race 15 and sub outer race 16, which were assembled in the first step, such that the pair of inner ring raceways 1 face first and second outer ring raceways 18, 19, respectively.

Next, in a third step, the shaft 2 is made to be eccentric with the main outer race 15 and sub outer race 16, as shown in FIG. 6, and a specified number of balls 5 are inserted in the space 8 between the pair of inner ring raceways 1 and first and second outer ring raceways 18, 19.

Next, in a fourth step as shown in FIG. 8(D), the shaft 2 is made to be concentric with the main outer race 15 and sub outer race 16, and the specified number of balls 5 that were inserted into between the pair of inner ring raceways 1 and first and second outer ring raceways 18, 19 are arranged such that they are evenly spaced around in the circumferential direction. Also, in this fourth process, cages 6 are installed to hold the evenly spaced balls 5.

Finally, in a fifth process as shown in FIG. 8(E), by displacing the sub outer race 16 in the state of FIG. 8(D) in the axial direction (left direction in FIG. 8(D)) along the inner peripheral surface of the main outer race 15, the pitch between the first and second outer ring raceways 18, 19 is shortened to become equal to the pitch $p_2$, as shown in FIG. 8(E), required for applying the specified pre-load. In this state, the specified pre-load is applied to the balls 5. Also, seals 7a, 7b are installed to complete the pre-loaded double-row rolling bearing unit.

In the case of the second example described above, the first outer ring raceway 18 is directly formed around the inner peripheral surface of the main outer race 15, however, as shown in a third example in FIGS. 9(A) and 9(B), it is also possible to fit a pair of sub outer races 16a, 16b into a main outer race 15a that does not have any outer ring raceways itself. In this case, the combination of the main outer race 15a and sub outer races 16a (or 16b) corresponds to the first member.

Likewise, in the case of the first example, it is possible as shown in a fourth example in FIGS. 10(A) and 10(B) to fit a pair of inner races 11a, 11b around the shaft 2. In this case, the combination of the shaft 2 and inner race 11a (or 11b) corresponds to the first member.

By making a pair of sub outer races 16a, 16b or a pair of inner races 11a, 11b in this way, it is possible to displace either or each of the sub outer races 16a, 16b or of the inner races 11a, 11b when applying the pre-load. Of course, it is possible as shown in FIGS. 11(A) and (B) to have a combination of the structures shown in both FIGS. 9(A), 9(B) and FIGS. 10(A), 10(B).

In the structure of FIG. 11(A), for example, the combination of the shaft 2 and the inner race 11a corresponds to the first member while the combination of the main outer race 15a and the sub outer races 16a and 16b corresponds to the second member, with the inner race 11b corresponding to the third member. Or, in the structure of FIG. 11(A), the combination of the shaft 2 and the inner race 11b corresponds to the first member, while the combination of the main outer race 15a and the sub outer races 16a and 16b corresponds to the second member, with the inner race 11a corresponding to the third member.

In the structure of FIG. 11(B), for example, the combination of the main outer race 15a and the sub outer race 16a corresponds to the first member while the combination of the shaft 2 and the inner races 11a and 11b corresponds to the second member, with the sub outer race 16b corresponding to the third member. Or, in the structure of FIG. 11(B), the combination of the main outer race 15a and the sub outer race 16b corresponds to the first member while the combination of the shaft 2 and the inner races 11a and 11b corresponds to the second member, with the sub outer race 16a corresponding to the third member.

In order to apply a proper pre-load, the amount of displacement of the inner race (or sub outer race) is adjusted with respect to the small-diameter section 9a of the shaft 9 (or large-diameter section 15b of the main outer race 15) and thus the application of the specified pre-load is applied, as shown in FIG. 12. For example, when assembling the pre-loaded double-row rolling bearing unit with the inner race 11 that is constructed according to the procedure described in shown FIGS. 7(A) to 7(D), one end (bottom end in FIG. 12) of the shaft 9 is supported by the support gear 20, and the oscillator 21 comes in contact with one end (bottom end in FIG. 12) of the outer race 13 and applies vibration to the double-row rolling bearing unit by way of this outer race 13. Moreover, an oscillation sensor 22 comes in contact with the other end (top end in FIG. 12) of the outer race 13, to be capable of measuring the resonant frequency of the double-row rolling bearing unit.

The resonant frequency of the double-row rolling bearing unit that is detected by the oscillation sensor 22 is transmitted through an amplifier 23 and FFT converter 24 which performs fast Fourier transformation=FFT, and is then input to a controller 25. This controller 25 controls the pusher 26, which pushes the inner race 11 in the small-diameter section 9a of the shaft 9. A hydraulic cylinder or feed screw, for example, can be used as this pusher 26. The controller 25 controls the amount of hydraulic fluid or pressure (angle of rotation in the case of a feed screw) to send to the pusher 26, and adjusts the pressure at which the pushing arm 27 of this pusher 26 pushes the inner race 11.

To apply the proper pre-load to each of the balls 5 by pushing the inner race 11 into the small-diameter section 9a when manufacturing the double-row rolling bearing unit, while the oscillation sensor 22 is provided to measure the resonant frequency of the double-row rolling bearing unit, hydraulic fluid is sent to the pusher 26, and then the pushing arm 27 pushes the inner race 11 and presses this inner race 11 into the small-diameter section 9a of the shaft 9. Also, when the resonant frequency nearly matches a frequency that was set beforehand, the feeding of hydraulic fluid to the pusher 26 stops, and the pushing-in operation ends. In this state, the pre-loaded double-row rolling bearing unit is completed with a proper pre-load.

The fact that there is a fixed relationship between the resonant frequency of the double-row rolling bearing unit and the amount of pre-load has been known and has been disclosed, for example in Japanese Patent Publication No. Tokukou Hei 2-61100. Moreover, by measuring beforehand the resonant frequency of a pre-loaded rolling bearing unit that has the same construction as the rolling bearing unit to be manufactured, and which has been loaded with a proper pre-load, and then setting this measured value in the controller 25, the supply of hydraulic fluid to the pusher 26 will stop when the pre-load of the rolling bearing unit reaches this value. The work of applying a proper pre-load to the double-row rolling bearing unit for setting the resonant frequency needs to be performed only once, so even in cases when the work of applying a proper pre-load is troublesome, it does not hinder the efficiency of the manufacturing work.

When performing the aforementioned method shown in FIG. 12 for applying a pre-load to the double-row rolling bearing unit shown in FIGS. 7 thru 10, it is not always possible to accurately apply the pre-load as desired. This is due to elastic deformation of the shaft 9 (in the case of the construction shown in FIG. 7) or the main outer race 15 (in the case of the construction shown in FIG. 8).

For example, when applying a pre-load to the balls 5 that are arranged in double rows, as shown in FIG. 12, it is necessary to apply a pushing force to the shaft 9 and inner race 11 along the axial direction. Also, the value of this pushing force must be larger than the movement resistance force due to friction that acts between the outer peripheral surface of those shaft 9 and the inner peripheral surface of the inner race 11.

The movement resistance force that occurs when applying the pre-load acts as a compression force of the shaft 9 in the axial direction. It causes elastic deformation of this shaft 9, which thus changes the distance between the balls 5 arranged in the double rows. Particularly, when this distance becomes large, and when the diameter of the shaft 9 (particularly the small-diameter section 9a) is small (in diameter), the amount that this distance has changed due to the aforementioned elastic deformation is too large to be ignored. Moreover, when the pushing force that pushes the inner race 11 by way of the pushing arm 27 is removed, the distance between the first and second inner ring raceways 10, 12 becomes larger due to the elastic restoration of the shaft 9 (particularly the small-diameter section 9a). As a result, the pre-load applied to each of the balls 5 is lower than what it was when hydraulic fluid being fed to the pusher 26 stops to complete the pre-load operation, thus the pre-load is insufficient.

SUMMARY OF THE INVENTION

An object of the present invention is to provide a method for manufacturing a pre-loaded double-row rolling bearing unit, taking the previously mentioned problem into consideration, and making it possible to keep at a proper value the pre-load to cach of the balls in the elastically restored state of the shaft after the pre-loading operation is completed.

DETAILED DESCRIPTION OF THE PREFERRED EMBODIMENTS

Figure 1:
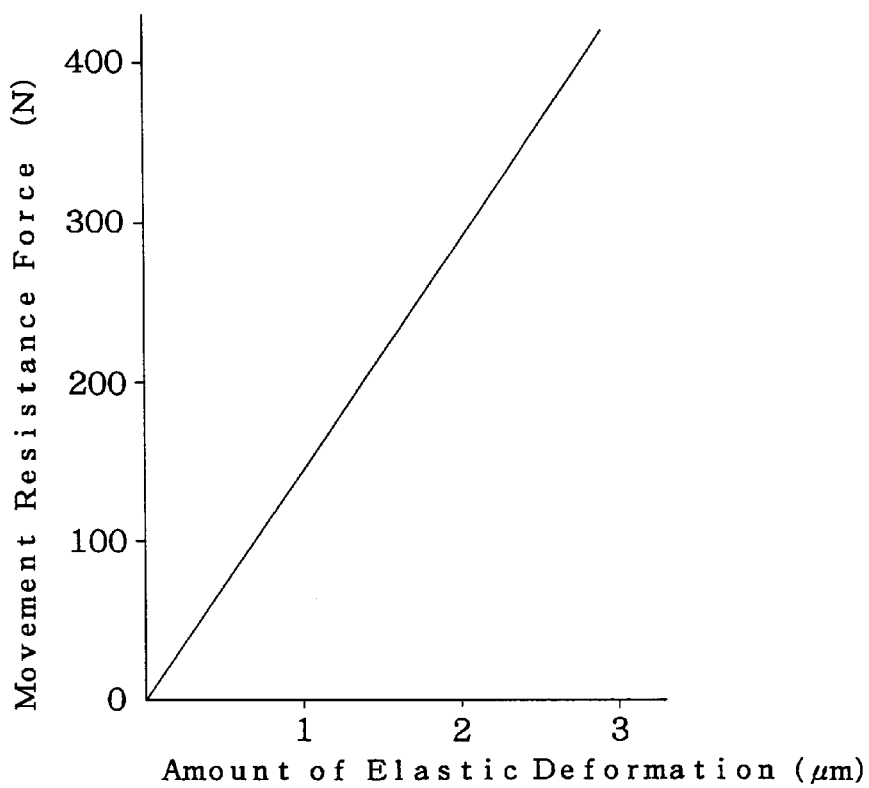
FIG. 1 is a graph for explanation of a first example in the embodiment of the present invention, to show a relation between the movement resistance force that is a resistance against axially pushing the inner race to apply a pre-load on it, and the displacement amount (elastic deformation amount) of the pitch of the double-row of balls due to elastic deformation.

All of the methods for manufacturing a pre-loaded double-row rolling bearing unit of this invention are similar to the manufacturing method of the pre-loaded double-row rolling bearing unit disclosed in Japanese Patent Publication No. Tokukai Hei 6-344233, in that they comprise components including a first member having a first peripheral surface, a second member that is concentric to this first member and which has a second peripheral surface that faces the first peripheral surface, a first raceway that is formed around the first peripheral surface, a second raceway formed around part of the second peripheral surface that faces the first raceway, a third raceway that is formed around the second peripheral surface on a portion separated in the axial direction from this second raceway, a third member which fits under a sufficient fitting strength around the first member and is supported such that it is concentric with the first and second members and which has a third peripheral surface that faces the second peripheral surface, a fourth raceway that is formed on the part of the third peripheral surface that faces the third raceway, a plurality of balls that are located in double-rows between the first and second raceways and between the third and fourth raceways, wherein by adjusting the fitting depth of the third member with respect to the first member, a proper pre-load is applied to the respective balls to make a pre-loaded double-row rolling bearing unit.

Moreover, the fitting depth is adjusted such that the proper pre-load can be applied by pushing and moving the third member in the axial direction with respect to the first member.

Particularly, in the method for manufacturing a pre-loaded double-row rolling bearing unit in a first feature, the movement resistance force, that occurs due to the fit between the first and third members and that resists the movement of the third member by pushing in the axial direction, is calculated or measured, and the amount of elastic deformation of the respective members based on this movement resistance force is calculated. The work of press-fitting the third member is then completed when the third member has been moved with respect to the first member in the direction of increasing the pre-load, by a compensation value in length that corresponds to the aforementioned elastic deformation amount, further from the position which corresponds to the required length for the proper pre-load.

Moreover, in the method for manufacturing a pre-loaded double-row rolling bearing unit in a third feature, by removing or reducing the pushing force on the third member before the third member reaches the axial position with respect to the first member that corresponds to the required length for applying the proper pre-load, the space between the rows of raceways increases due to the elastic restoration force of the components, and the amount in change of the pre-load, or the amount in change in the space between the raceways is measured before and after this force is removed or reduced. Then, based on this measured amount in change in pre-load and the amount of change in the aforementioned pushing force, a relationship of the amount in change in pre-load due to the elastic deformation of the components is found and a compensation value in length is calculated. The work of press-fitting of the third member is then completed when the third member is moved with respect to the first member in the direction of increasing the pre-load, by an amount equal to this compensation value in length, further from the position which corresponds to the required length for the proper pre-load.

Furthermore, in the methods for manufacturing a pre-loaded double-row rolling bearing unit in second and fourth features, when performing the methods for manufacturing a pre-loaded double-row rolling bearing unit in the first and third features, the amount of change in pre-load is found based on the amount of change in resonant frequency of the double-row rolling bearing unit, and a compensation value for the resonant frequency that corresponds to the compensation value in length is found. Press-fitting of the third member is then completed when a frequency compensated is reached by the addition of this compensation value to the resonant frequency when applying the proper pre-load.

Using the methods for manufacturing a pre-loaded double-row rolling bearing unit of this invention, as constructed aforementioned, it is possible to keep at a proper value the pre-load to the respective balls in the state where the first member has been elastically restored after the pre-loading work is completed.

This invention will be explained in further detail using FIGS. 1 thru 4 as a reference.

This invention is characterized by a method for keeping at a proper value the pre-load to the balls in each row when the components of the bearing, which have been elastically deformed by the force used when performing the pre-loading work, have been elastically restored after this force has been removed. The detailed construction of the double-row rolling bearing unit, that is pre-loaded according to the method of this invention is the substantially same as that of the bearing unit shown in FIGS. 7(A) and 7(B) thru FIG. 12 and, for example, disclosed in Japanese Patent Publication No. Tokukai Hei 6-344233.

Moreover, when employing this invention, the pre-load that is applied to the double-row rolling bearing unit at each point in time is found from the resonant frequency of this double-row rolling bearing unit. Therefore, it is possible to use the any kind of devices, including the construction shown in FIG. 12, disclosed in Japanese Patent Publication No. Tokukai Hei 6-344233, and known before as the device for vibrating this double-row rolling bearing unit.

Therefore, in the following explanation, the invention will be employed for the construction shown in FIGS. 7(A) and 7(B) thru FIG. 12.

Figure 2:
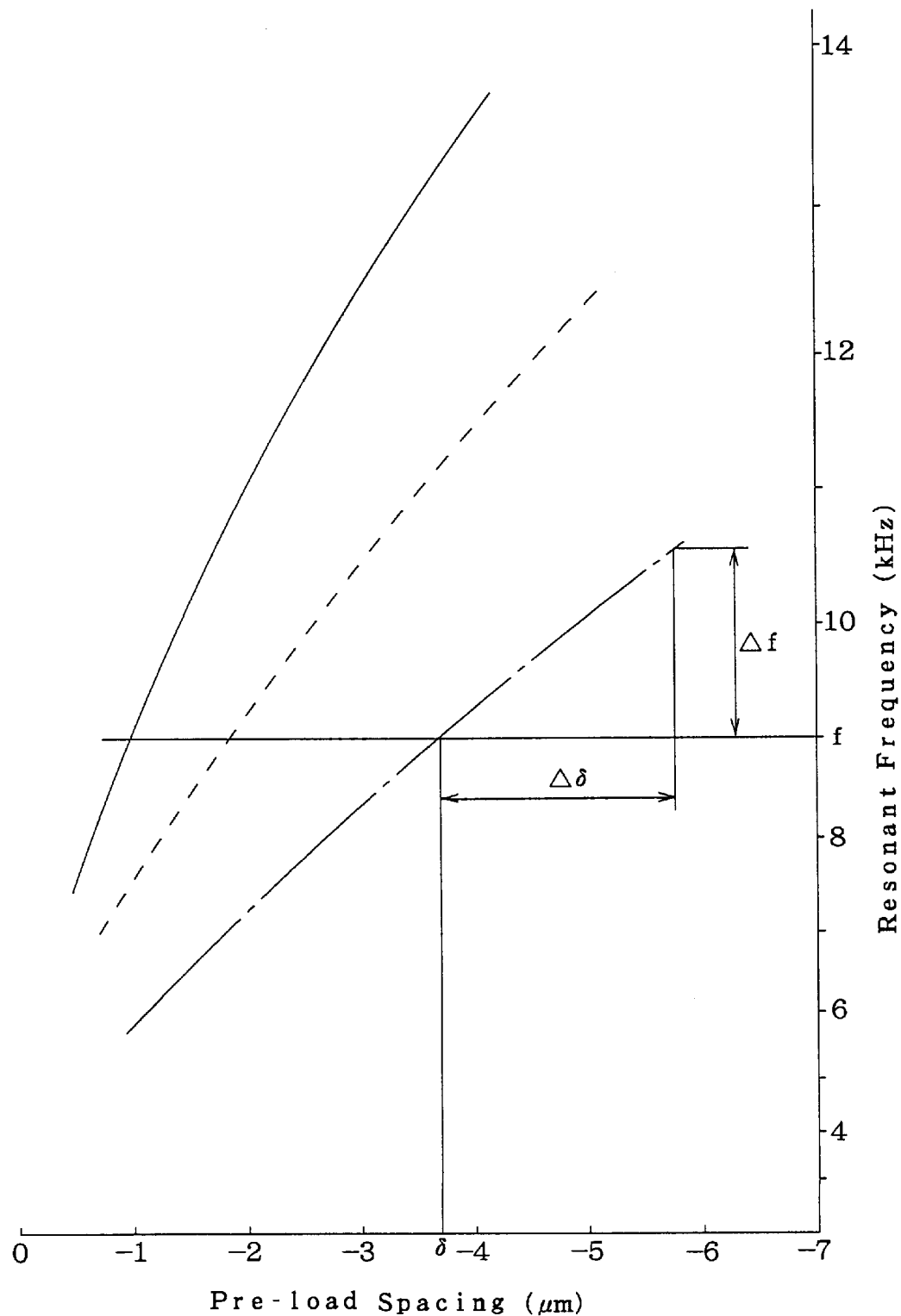
FIG. 2 is a graph, similar to FIG. 1, to show a relation between the preload spacing and the resonant frequency on three different kinds of the double-row rolling bearing units.

First, FIGS. 1 and 2 are graphs which explain the invention in the first and second features. In FIG. 2 (and FIG. 3 to be described later), the three lines, solid, dashed and chain lines, are for three different double-row rolling bearings unit, and they show the relationship between the respective pre-load spacing and resonant frequency. The resistance force that opposes the pushing movement in the axial direction of the inner race 11 and which is due to the fit of the small-diameter section 9a of the first member or shaft 9 and the third member or inner race 11, can be calculated according to the dimensions of those shaft 9 and inner race 11 (sizes and material), and it can be actually measured with the inner race 11 fitted around the small-diameter section 9a. Moreover, the amount of elastic deformation due to this movement resistance force of the respective components of the double-row rolling bearing unit, or in other words, the shaft 9 and inner race 11, as well as the second member or outer race 13 and the balls 5, can be calculated according to the dimensions for each of these members 9, 11, 13, 5. In other words, there is a proportional relationship between the resistance force to movement and the amount of elastic deformation as shown in FIG. 1. Moreover, if the movement resistance force is known, it is possible to find as a compensated value in length the change in spacing between the balls 5 that are arranged in the rows when pushing the inner race 11 to apply a pre-load to each of the balls 5.

On the other hand, as can be seen in FIG. 2, the relationship between the value of the pre-load (negative spacing) that is applied to the double-row rolling bearing unit and the resonant frequency of the double-row rolling bearing unit is different for each bearing but is nearly a proportional relationship. Moreover, if the bearing of the double-row rolling bearing unit to be pre-loaded with a proper pre-load is set, then it is possible to find the amount that the resonant frequency changes to correspond to the change in the pre-load.

Thereby, when employing this invention, while the resonant frequency of the double-row rolling bearing unit to be pre-loaded with a proper pre-load is measured, the inner race 11 is moved in the axial direction with respect to the small-diameter section 9a of the shaft 9. Then, press-fitting of the inner race 11 is completed when the inner race 11 has been moved by a compensation amount in length, which corresponds to the amount of elastic deformation that occurs due to the resistance force against movement, in the direction of increasing pre-load (left direction in FIG. 7(C) and downward in FIG. 12), further from the position of length (corresponds to pitch $p_1$ of FIG. 7(D)) required for applying a proper pre-load to each of balls 5.

In explaining this with the example of FIG. 2 shown by the chain line, the amount of the pre-load that is related to the proper pre-load to be applied to the double-row rolling bearing unit at the point where it is completed, is δ, and the resonant frequency of the double-row rolling bearing unit at that state is f. However, in the case of this invention, the amount of the pre-load related to the proper pre-load at the point where press-fitting work is completed is larger than δ by a compensation amount Δδ, that is δ+Δδ. As the pre-load is increased, the resonant frequency at the point where press-fitting work is completed becomes f+Δf.

If the press-fitting work is completed in this way, with the pushing arm 27 still not retracted from the inner race 11, the pitch between the first and second inner ring raceways 10, 12 is shorter than the length required for applying a proper pre-load to each of the balls 5 by the compensation amount Δδ. In other words, the pre-load applied to each of those balls 5 is larger than the proper value. When the pushing arm 27 is retracted from the inner race 11, all of the members 9, 11, 13, and 5 are elastically restored. In the construction shown in FIGS. 7(A) and 7(B) thru FIG. 12, particularly, the elastic deformation of the small-diameter section 9a of the shaft 9 is the largest, and the pitch between the first and second inner ring raceways 10 and 12 is increased by the compensation amount Δδ, and the pre-load is decreased by this compensation amount Δδ. As a result, the pre-load applied to the double-row rolling bearing unit becomes the proper value.

Figure 3:
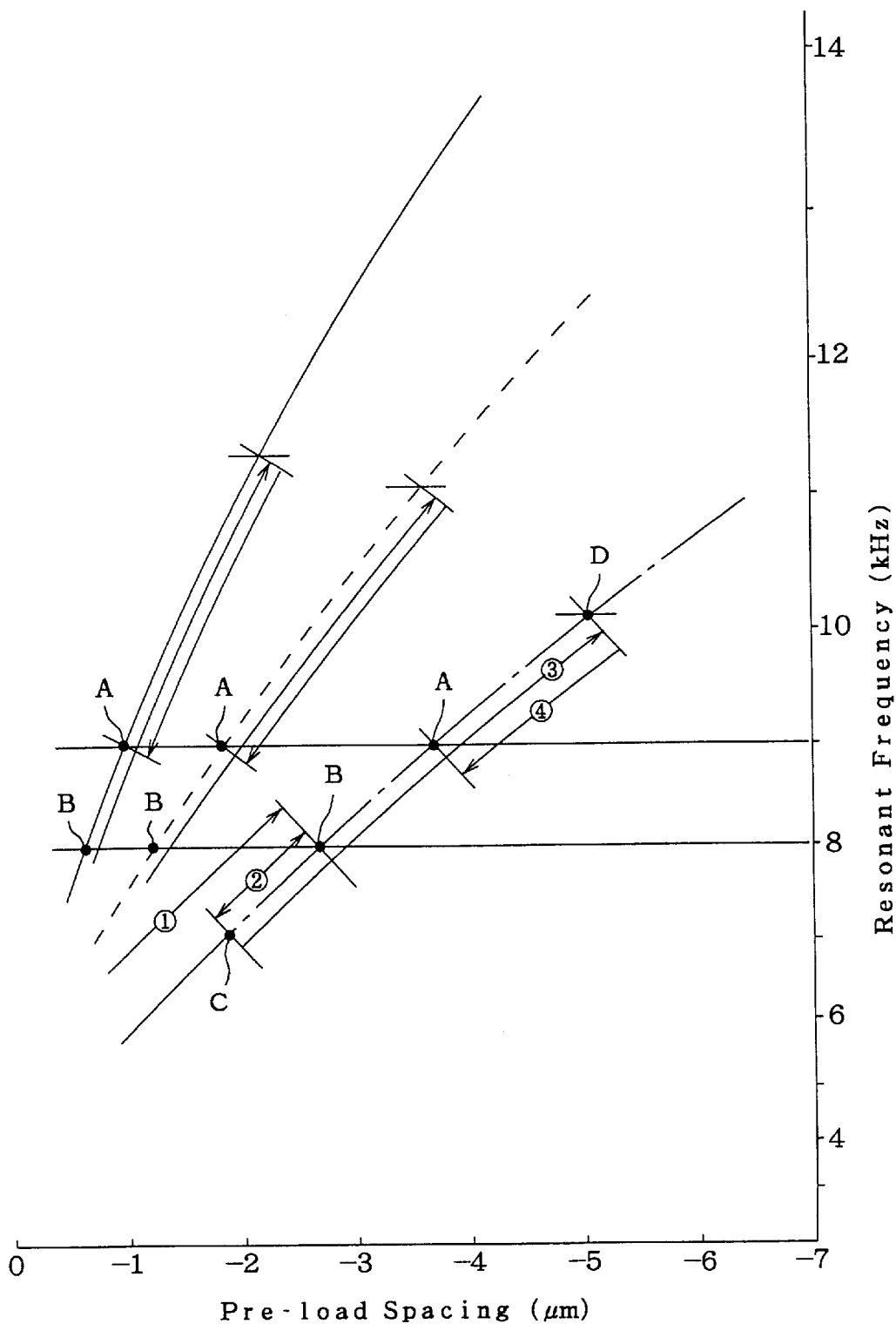
FIG. 3 is a graph, similar to FIG. 2, to explain a second example of the embodiments of the present invention.

Next, FIG. 3 is a graph which explains the invention in the third and fourth features. This example is also an explanation of employing the invention for the construction shown in FIGS. 7(A) and 7(B) thru FIG. 12. When the position in the axial direction of the third member or inner race 11 with respect to the first member or shaft 9 is in the position that corresponds with the length required for applying a proper pre-load, in other words at point B before reaching point A on each of the curves shown in FIG. 3 (in the example shown in the figure, this is the point where the inner race 11 has been pushed to by the pushing arm 27 such that the proper pre-load is applied), the force pushing the inner race 11 is removed or decreased. As a result, the shaft 9 of the double-row rolling bearing unit is elastically restored, and in so doing the pitch between the first and second inner ring raceways 10 and 12 is increased and the pre-load applied to each of the balls 5 arranged in the rows decreases until it reaches a value that corresponds to point C on the chain line.

Then, the amount of change in the pre-load or the amount of displacement of the spacing between balls 5 located in the rows before and after removing or decreasing the aforementioned force is found from the relationship between the pre-load and resonant frequency that are measured beforehand. Moreover, the amount of change in the pre-load, due to elastic deformation of the shaft 9 caused by the movement resistance force, is found based on this measured value of change in pre-load and change in the force, and a compensation value in length is calculated, and this compensation value in length is then converted to a compensation value for the resonant frequency.

In this way, if a compensation amount is found for the resonant frequency, then in the same way as was done in the first example described above, the inner race 11 is moved with respect to the shaft 9, in the direction of increasing pre-load, further from the position corresponding to the length required for the proper pre-load just by the compensation amount for the resonant frequency that corresponds to the compensation value in length, and when it has been moved to the position that corresponds with point D on the chain line, the press-fitting work with the inner race 11 is completed. As a result, like in the first example described above, it is possible to make a double-row rolling bearing unit that is pre-loaded with a proper pre-load.

The arrows 1 thru 4 in FIG. 3 indicate the order of changes in the pre-load spacing and resonant frequency that occur when employing this invention.

Figure 4:
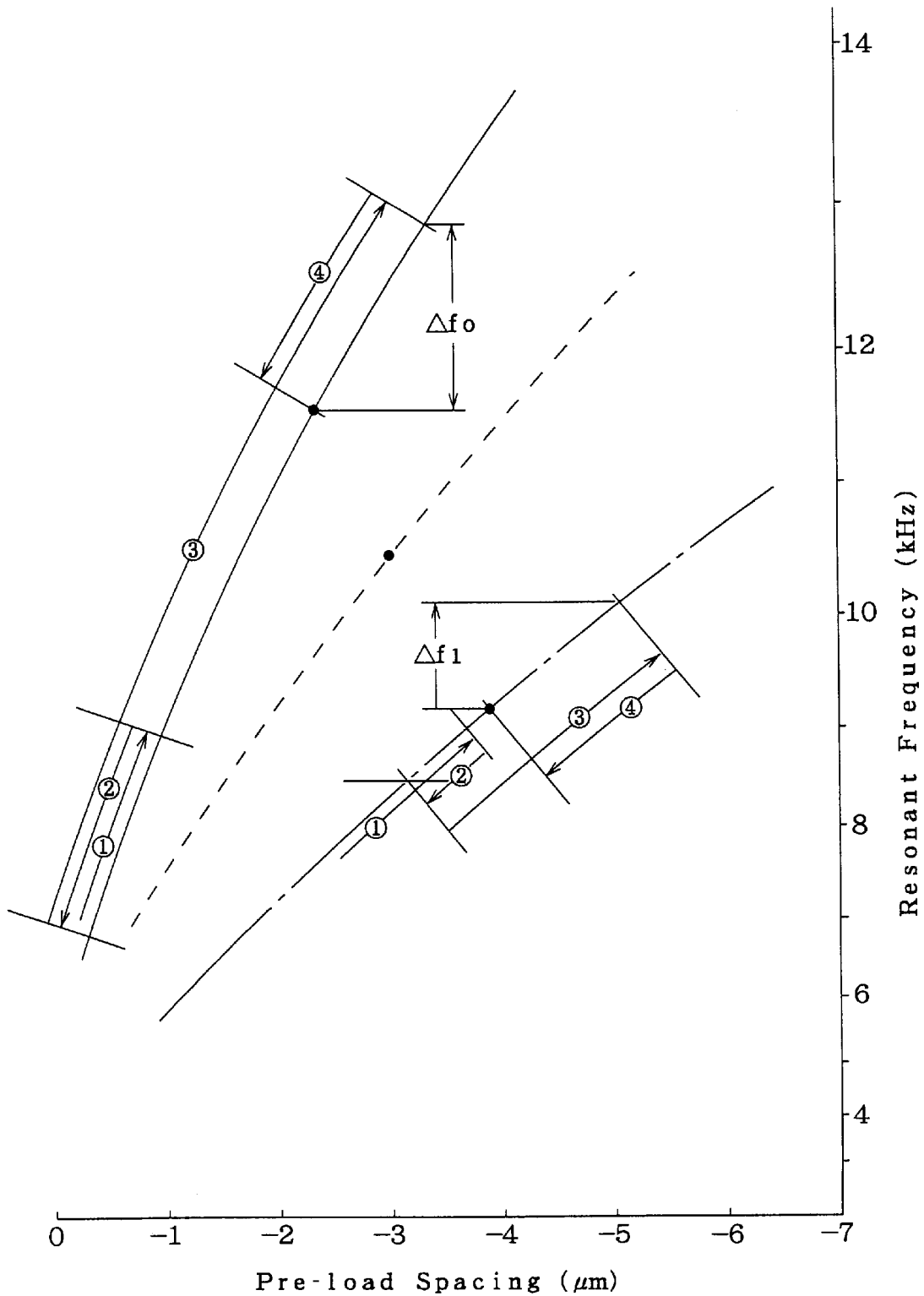
FIG. 4 is a graph, similar to FIG. 2, to explain a third example of the embodiments of the present invention.
Figure 5A:
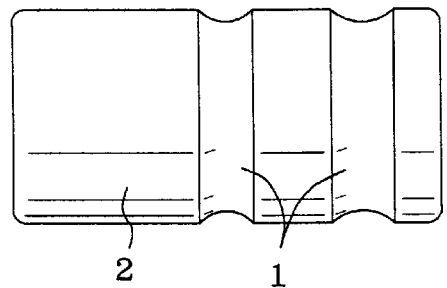
FIGS. 5(A) to 5(C) are cross sectional views to show a conventional rolling bearing unit, in the completed state (FIG. 5(C)) and its components (FIGS. 5(A), 5(B)).
Figure 5B:
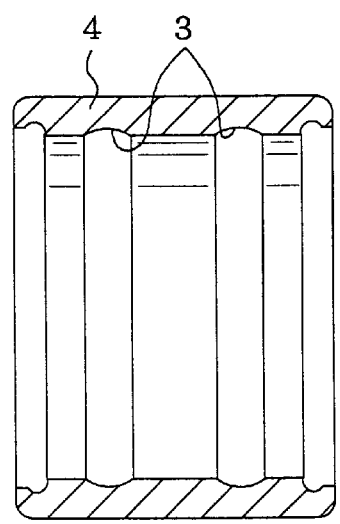
Figure 5C:
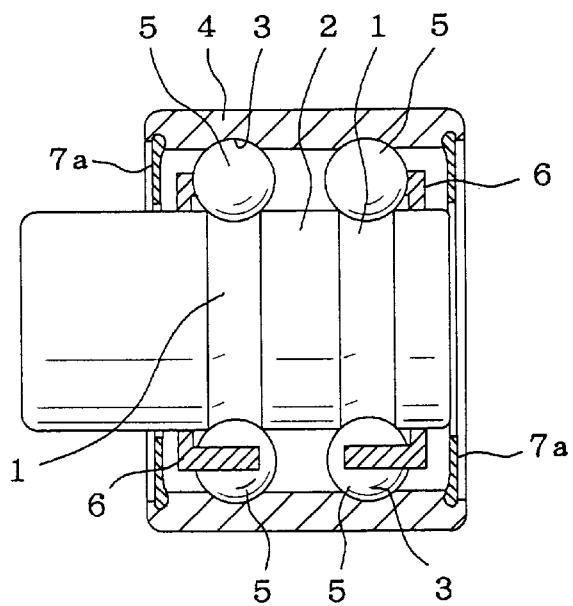
Figure 6:
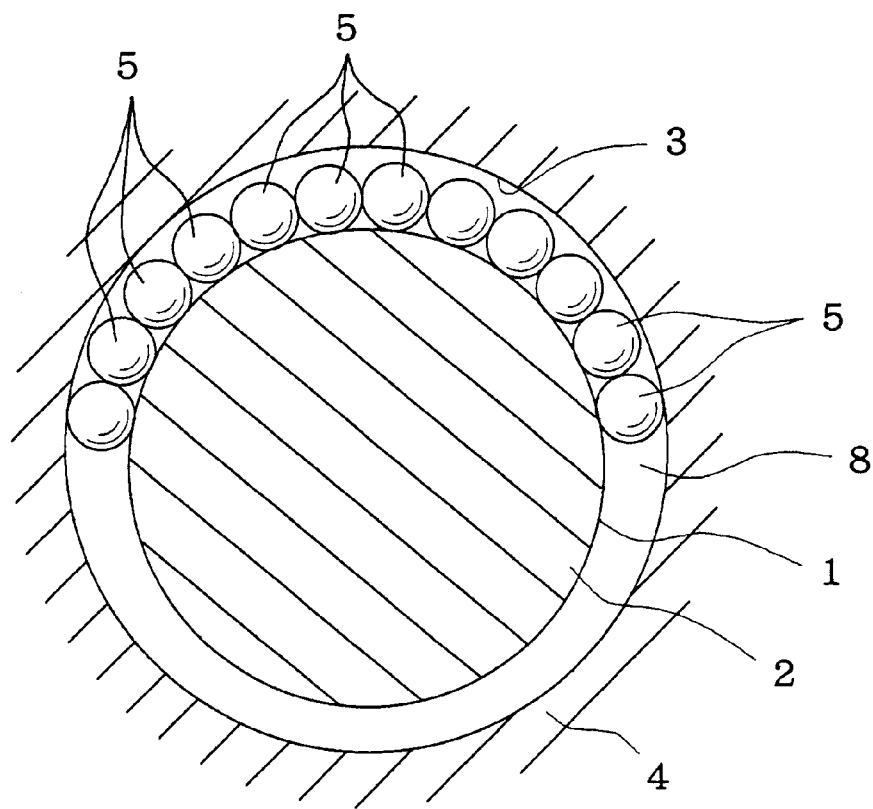
FIG. 6 is a cross sectional view to show the state where the outer ring raceway and inner ring raceway are eccentric with respect to each other to insert balls therebetween.
Figure 7:
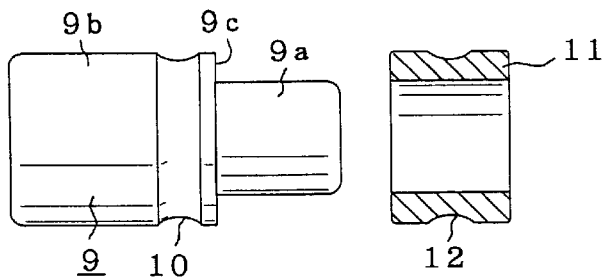
FIGS. 7(A) to 7(D) are cross sectional views to show a first example of the specific structures of the double-row rolling bearing unit applicable to the precision rotation support sections, corresponding to the manufacturing steps.
Figure 7:
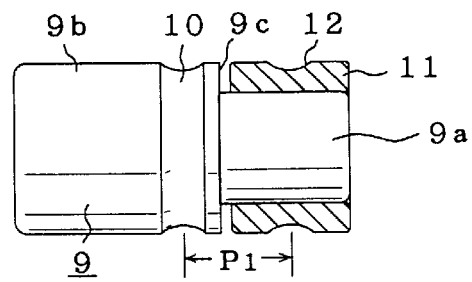
Figure 7:
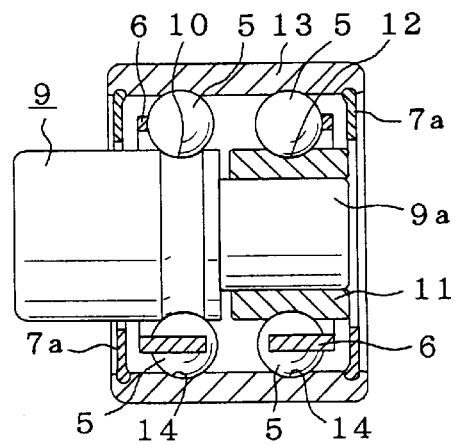
Figure 7:
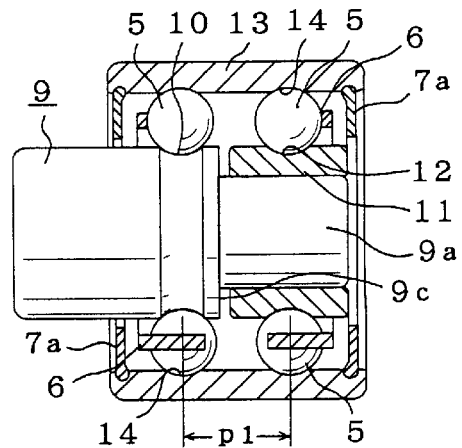
Figure 8:
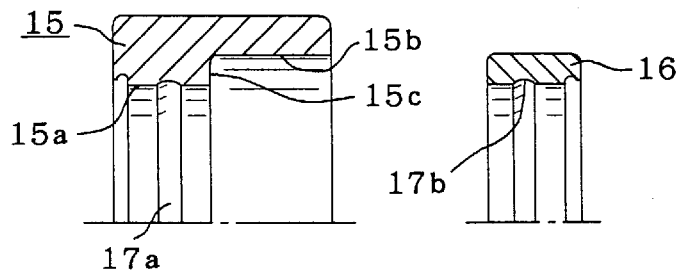
FIGS. 8(A) to 8(E) are cross sectional views to show a second example of the specific structures corresponding to the manufacturing steps.
Figure 8:
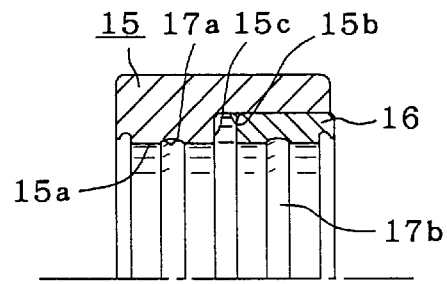
Figure 8:
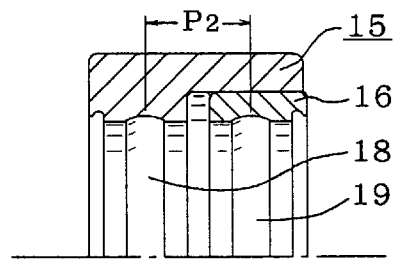
Figure 8:
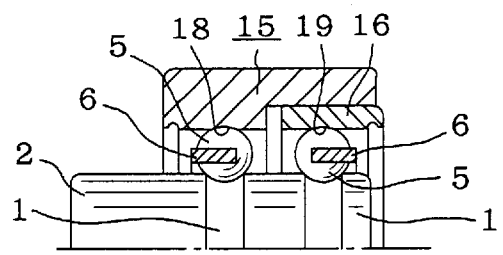
Figure 8:
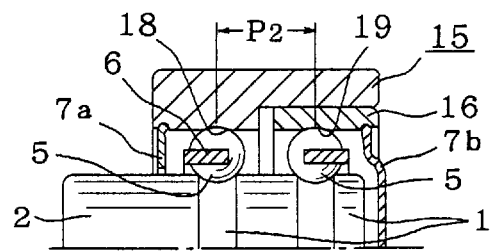
Figure 9:
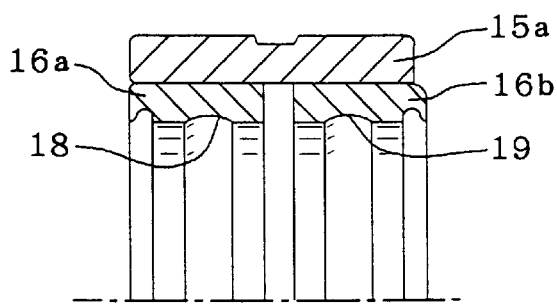
FIGS. 9(A) and 9(B) are cross sectional views to show a third example of the specific structures corresponding to the manufacturing steps.
Figure 9:
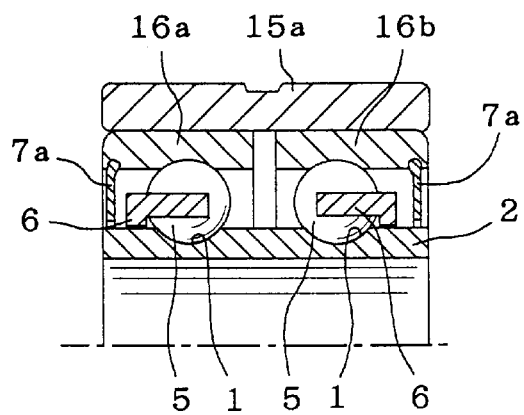
Figure 10:
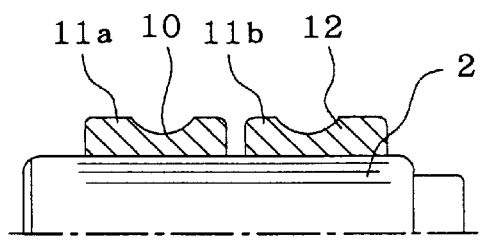
FIGS. 10(A) and 10(B) are cross sectional views to show a fourth example of the specific structures corresponding to the manufacturing steps.
Figure 10:
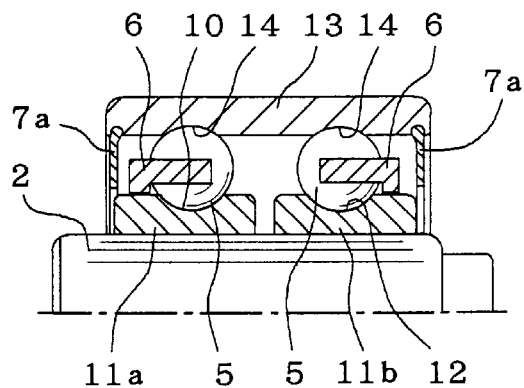
Figure 11:
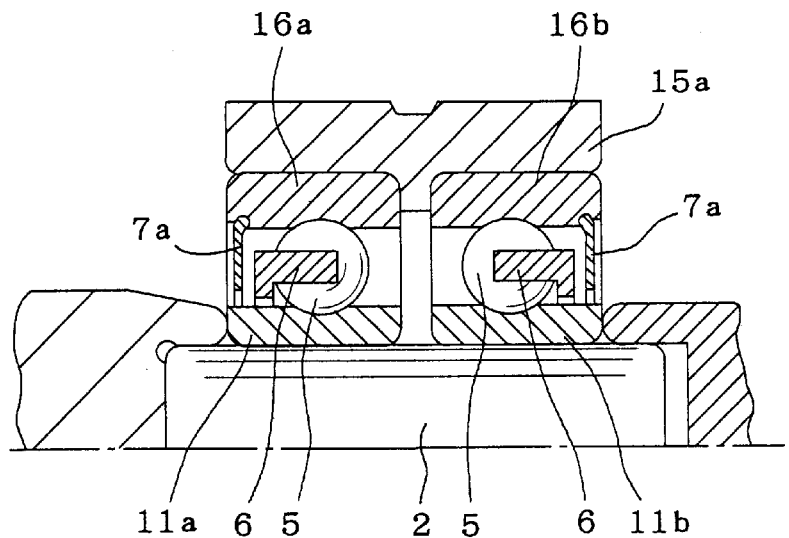
FIGS. 11(A) and 11(B) are cross sectional views of an example of combination of the structures of FIGS. 9(A), 9(B) and FIGS. 10(A), 10(B).
Figure 11:
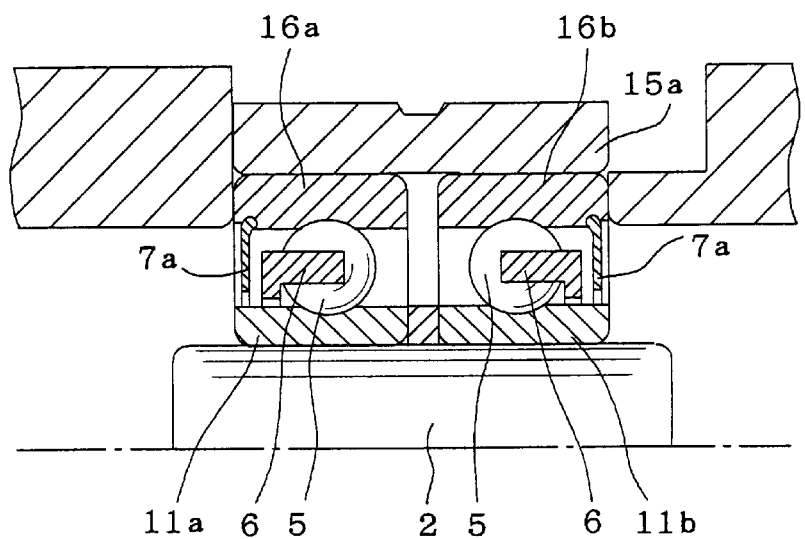
Figure 12:
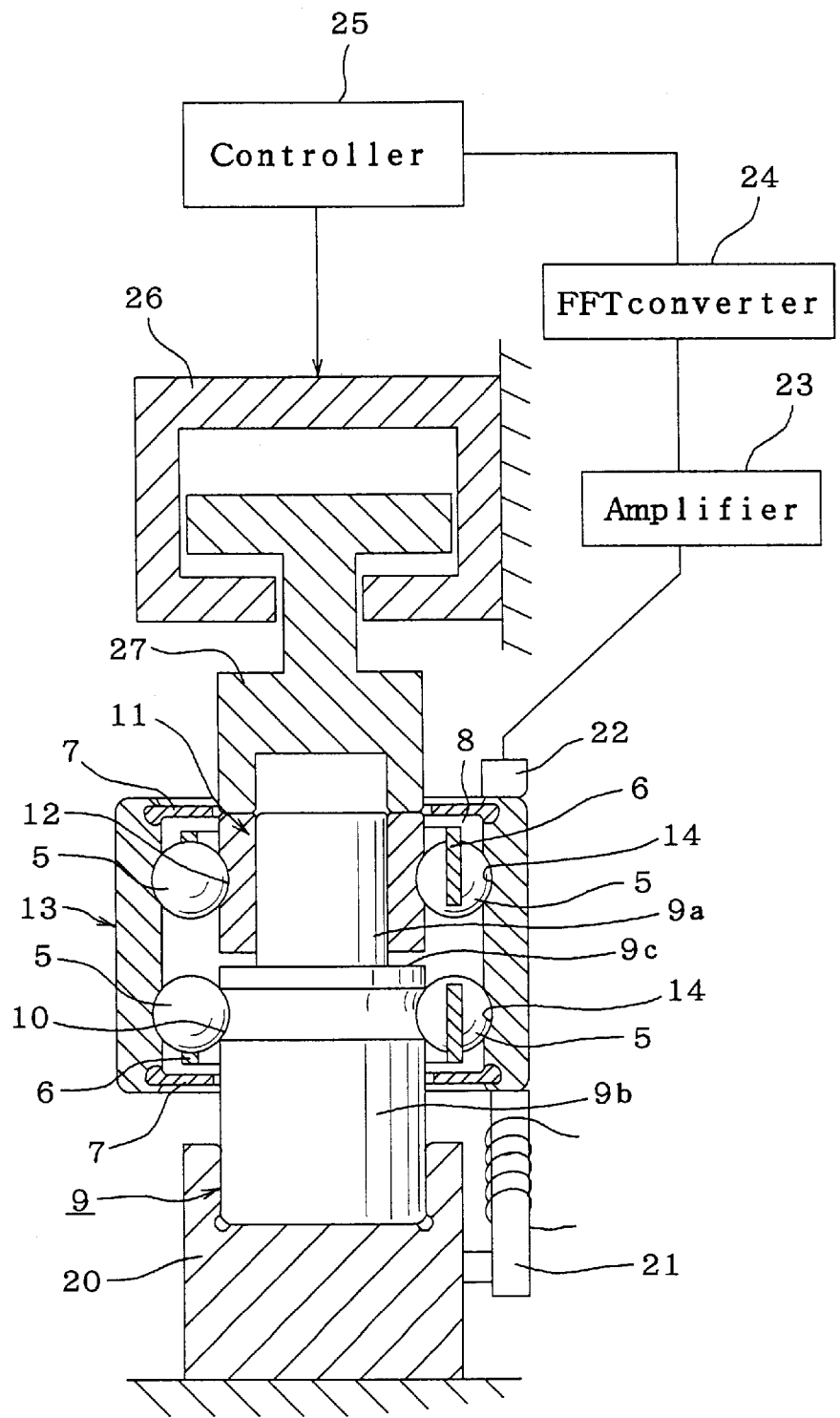
FIG. 12 is a cross sectional view to show an example of the pre-load control method and apparatus.

Next, FIG. 4 shows a third example of employing this invention which corresponds to a fifth feature. In both the first and second examples described above, it is intended that the pre-load applied to the double-row rolling bearing unit is the same regardless of the inherent differences in the respective bearings shown by the three kinds of lines, solid, dashed, chain lines, in FIGS. 2 and 3, and that the rigidity of the bearings in each of these double-row rolling bearings is considered to be fixed. However, in this example, the rigidity of the bearings is purposefully varied, so that the lost torque (rotation resistance) of the respective double-row rolling bearing units is fixed, regardless of the inherent differences in the respective bearings shown by the three kinds of lines, solid, dashed, chain lines, in FIG. 4.

In other words, in the case of a double-row rolling bearing unit where the amount of change in rigidity, caused by the difference in internal spacing of the bearing unit, with respect to the amount that the pushing arm 27 displaces the inner race 11 by pushing, is large, and whose resonant frequency greatly changes due to the amount of pre-loading, the compensation value increases, as shown by $\Delta f_0$ on the solid line in FIG. 4, while in the case of a double-row rolling bearing unit with little elastic deformation, the compensation value decreases, as shown by $\Delta f_1$ on the chain line in FIG. 4.

Therefore, the pre-load that is applied to the completed double-row rolling bearing unit increases in the double-row rolling bearing unit whose change in resonant frequency, caused by the change in pre-load with respect to the amount of displacement of the inner race 11 pushed by the pushing arm 27, is large, and conversely, it decreases in the double-row rolling bearing unit whose change in resonant frequency, caused by the change in pre-load with respect to the displacement amount, is small. By regulating the compensation value in this manner, it is possible to nearly fix the lost torque of the double-row rolling bearing unit.

The methods of manufacturing a pre-loaded double-row rolling bearing unit of this invention, as described above, make it possible to accurately control at the desired value the pre-load that is applied to the double-row rolling bearing unit, and thus contributes to improved performance of any kinds of precision devices such as the VTR, HDD or LBP in which this double-row rolling bearing unit is assembled.

What is claimed is:

1. A method for manufacturing a pre-loaded double-row rolling bearing unit comprising components including a first member having a first peripheral surface formed with a first raceway, a second member being concentric to the first member and having a second peripheral surface that faces the first peripheral surface to be formed with a second raceway facing the first raceway and with a third raceway separated in the axial direction from the second raceway, a third member fitted under a sufficient fitting strength around the first member and at a fitting depth with respect to said first member, supported to be concentric with the first and second members and having a third peripheral surface facing the second peripheral surface to be formed with a fourth raceway facing the third raceway, and a plurality of balls located in double-rows between the first and second raceways and between the third and fourth raceways, wherein a proper pre-load is applied to the respective balls by adjusting the fitting depth of the third member with respect to the first member, and the third member is pushed in the axial direction with respect to the first member to obtain the fitting depth in a length required for the proper pre-load, the method comprising the steps of calculating or measuring a movement resistance force that occurs due to the fit between the first and third members and that resists the pushing movement of the third member in the axial direction, calculating an amount of elastic deformation of the components based on the movement resistance force, and stopping the work of press-fitting the third member when the third member has been moved with respect to the first member in the direction of increasing the pre-load, by a compensation value in length that corresponds to the amount of elastic deformation, further from the position which corresponds to the length required for the proper pre-load.

2. The method for manufacturing a pre-loaded double-row rolling bearing unit of claim 1, further including the step of measuring the preload applied to the double-row rolling bearing unit by vibrating the components of the double-row rolling bearing unit to measure the resonant frequency of the double-row rolling bearing unit, wherein the movement resistance force required to axially move the third member is measured before the third member reaches an axial position with reference to the first member corresponding to a length required for application of a proper preload, a change amount of the resonant frequency is measured to obtain a preload change amount, a compensation amount of the resonant frequency corresponding to the compensation value in length is obtained, and the work of pres-fitting the third member is stopped when the resonant frequency of the double row rolling bearing unit becomes a value of the resonant frequency at the application of the proper preload plus the compensation amount of the resonant frequency.

3. The method of claim 1, wherein the compensation values are larger for the double row rolling bearing unit in which the amount of change in rigidity is larger comparing with the amount in displacement of the third member when being pushed, while the compensation values are smaller for the double row rolling bearing unit in which the amount of change in rigidity is smaller comparing with the amount in displacement of the third member when being pushed.

4. The method of claim 1, wherein the first member is a shaft with larger and smaller diameter portions, the second member is an outer race provided around the shaft, and the third member is an inner race fitted onto the smaller diameter portion of the shaft with a gap with respect to the larger diameter portion.

5. The method of claim 1, wherein the first member is a main outer race with smaller and larger diameter portions, the second member is a shaft provided through the main outer race, and the third member is a sub outer race fitted into the larger diameter portion of the main outer race with a gap with respect to the smaller diameter portion.

6. The method of claim 1, wherein the first member is a combination of a main outer race and a first sub outer race fitted into the main outer race, the second member is a shaft provided through the first member, and the third member is a second sub outer race fitted into the main outer race and adjacent the first sub outer race with a gap threrebetween.

7. The method of claim 1, wherein the first member is a combination of a shaft and a first inner race fitted onto the shaft, the second member is an outer race provided around the first member, and the third member is a second inner race fitted onto the shaft and adjacent the first inner race with a gap therebetween.

8. The method of claim 1, wherein the first member is a combination of a shaft and a first inner race fitted onto the shaft, the second member is a combination of a main outer race and a pair of sub outer races fitted into the main outer race and provided around the first member, and the third member is a second inner race fitted onto the shaft and adjacent the first inner race with a gap therebetween.

9. The method of claim 1, wherein the first member is a combination of a main outer race and a first sub outer race fitted into the main outer race, the second member is a combination of a shaft and a pair of inner races fitted onto the shaft, and the third member is a second sub outer race fitted into the main outer race and adjacent the first sub outer race with a gap therebetween.

10. A method for manufacturing a pre-loaded double-row rolling bearing unit comprising components including a first member having a first peripheral surface formed with a first raceway, a second member being concentric to the first member and having a second peripheral surface that faces the first peripheral surface to be formed with a second raceway facing the first raceway and with a third raceway separated in the axial direction from the second raceway, a third member fitted under a sufficient fitting strength around the first member and at a fitting depth with respect to said first member, supported to be concentric with the first and second members and having a third peripheral surface facing the second peripheral surface to be formed with a fourth raceway facing the third raceway, and a plurality of balls located in double-rows between the first and second raceways and between the third and fourth raceways, wherein a proper pre-load is applied to the respective balls by adjusting the fitting depth of the third member with respect to the first member, and the third member is pushed with a pushing force in the axial direction with respect to the first member to obtain the fitting depth in a length required for the proper pre-load, the method comprising the steps of removing or reducing the pushing force on the third member before the third member reaches an axial position with respect to the first member that corresponds to a length required for application of the proper pre-load, so that the space between the first raceway and the fourth raceways increases due to the elastic restoration force of the components, and measuring the amount in change of the pre-loaded that is the amount in change in the space between the first and fourth raceways before and after the pushing force is removed or reduced, obtaining a relationship of the amount in change in pre-load due to the elastic deformation of the components based on the measured amount in change in pre-load and the amount of change in the pushing force to calculate a compensation value in length, and the work of press-fitting of the third member is completed when the third member is moved with respect to the first member in the direction of increasing the pre-load, by an amount equal to the compensation value in length, further from the position which corresponds to the required length for the proper pre-load.

11. The method of claim 10, wherein the preload applied to the double row rolling bearing unit is measured by vibrating the components to obtain the resonant frequency of the double row rolling bearing unit, and the amount in change of the preload before and after the pushing force is removed or reduced is obtained through the amount in change of the resonant frequency, so that a compensation value of the resonant frequency corresponding to the compensation value in length is obtained, and the work of press-fitting the third member is stopped when the resonant frequency of the double row rolling member becomes a value of the resonant frequency at the application of the proper preload plus the compensation value of the resonant frequency.

* * * * *